(12) United States Patent
Gil et al.

(10) Patent No.: US 8,172,991 B2
(45) Date of Patent: May 8, 2012

(54) HYDROGEN GENERATING APPARATUS AND FUEL CELL POWER GENERATION SYSTEM

(75) Inventors: Jae-Hyoung Gil, Seoul (KR); Hye-Yeon Cha, Seongnam-si (KR); Jae-Hyuk Jank, Seongnam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1027 days.

(21) Appl. No.: 12/153,380

(22) Filed: May 16, 2008

(65) Prior Publication Data

US 2008/0318095 A1 Dec. 25, 2008

(30) Foreign Application Priority Data

May 16, 2007 (KR) .................. 10-2007-0047737

(51) Int. Cl.
*C25B 9/12* (2006.01)
(52) U.S. Cl. .................. 204/275.1; 204/230.2; 205/637

(58) Field of Classification Search ............... 204/230.2, 204/275.1; 205/637
See application file for complete search history.

(56) References Cited

U.S. PATENT DOCUMENTS 6,911,128 B2 * 6/2005 Klose ....................... 204/297.06
2004/0118677 A1 * 6/2004 Streckert et al. .............. 204/237

* cited by examiner

*Primary Examiner* — Alexa D. Neckel
*Assistant Examiner* — Nicholas A. Smith

(57) ABSTRACT

A hydrogen generating apparatus is disclosed, which can provide a constant amount of hydrogen regardless of its orientation. The hydrogen generating apparatus can include an electrolyte bath, which contains an electrolyte solution; a free-moving first electrode, which is positioned inside the electrolyte bath, and which generates electrons; a free-moving second electrode, which is positioned inside the electrolyte bath, and which receives the electrons to generate hydrogen; a spacer positioned between the first electrode and the second electrode; and a control unit, which is connected with the first electrode and the second electrode, to control an amount of electrons traveling from the first electrode to the second electrode.

18 Claims, 16 Drawing Sheets

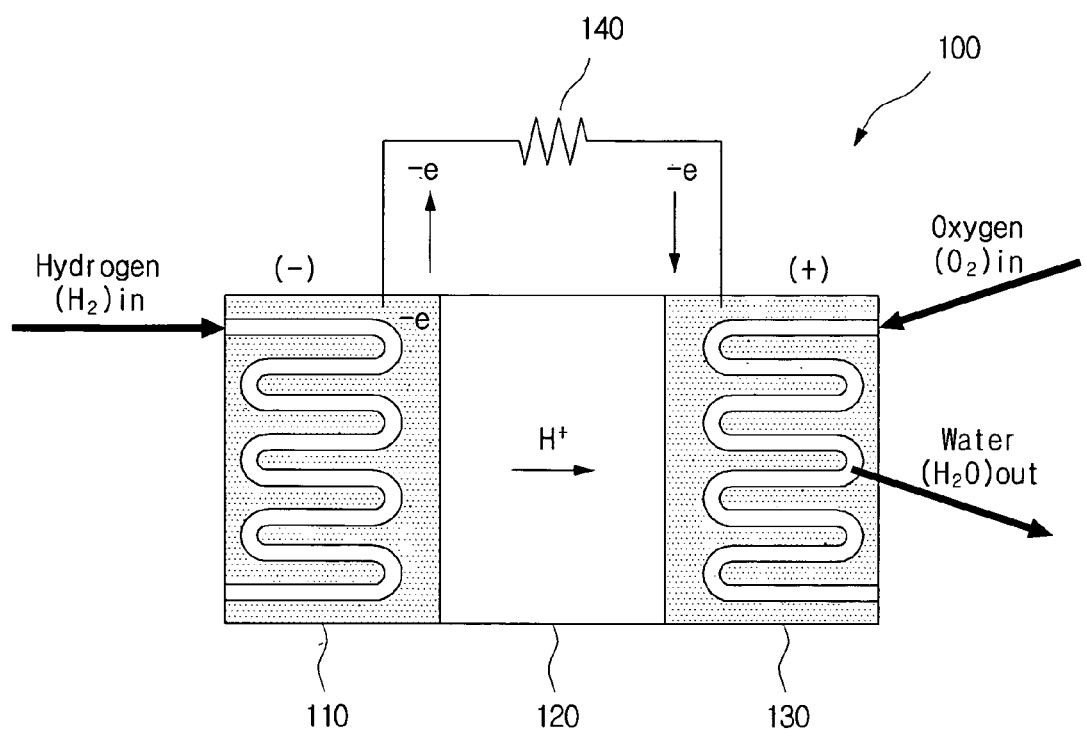

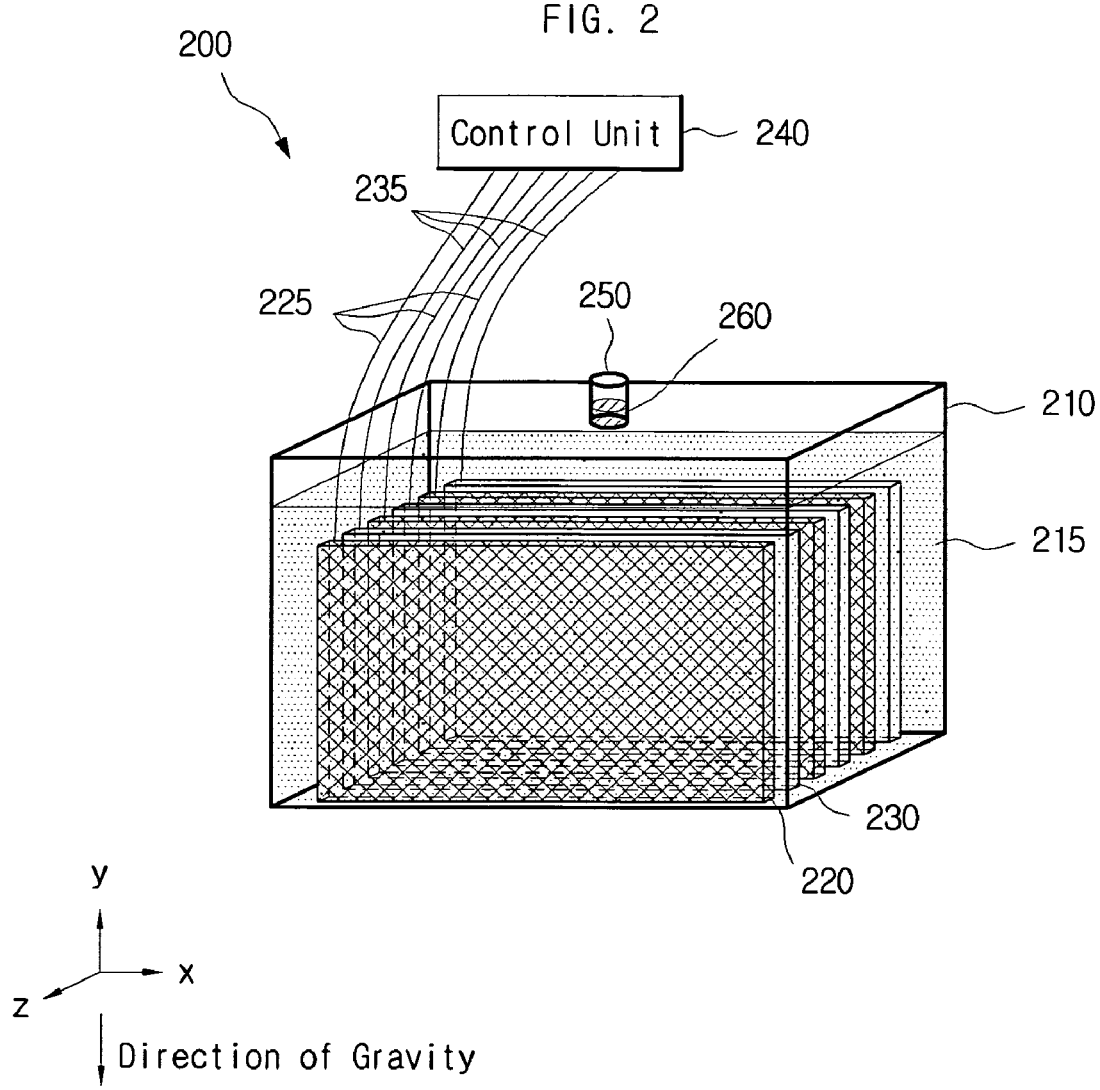

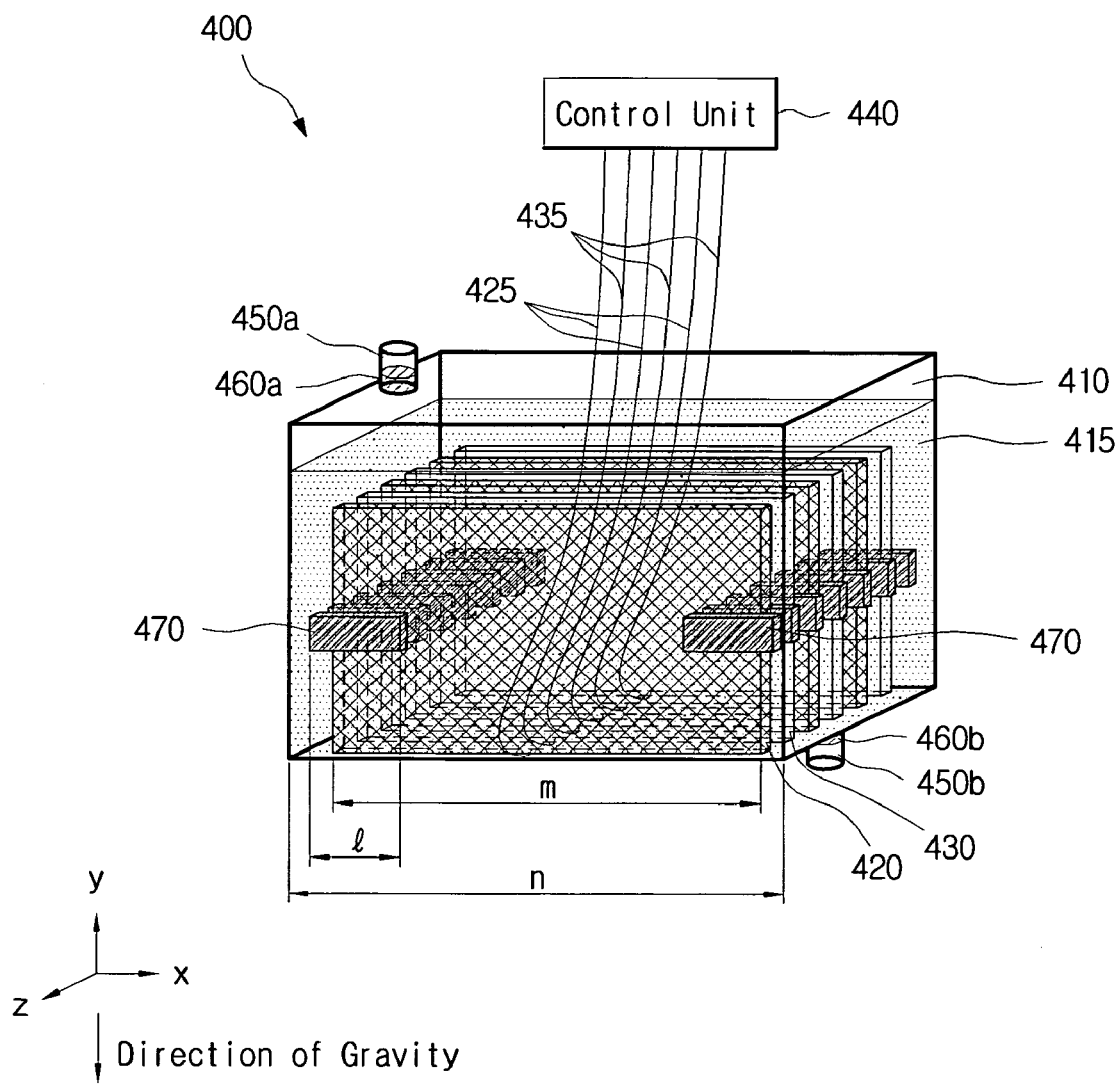

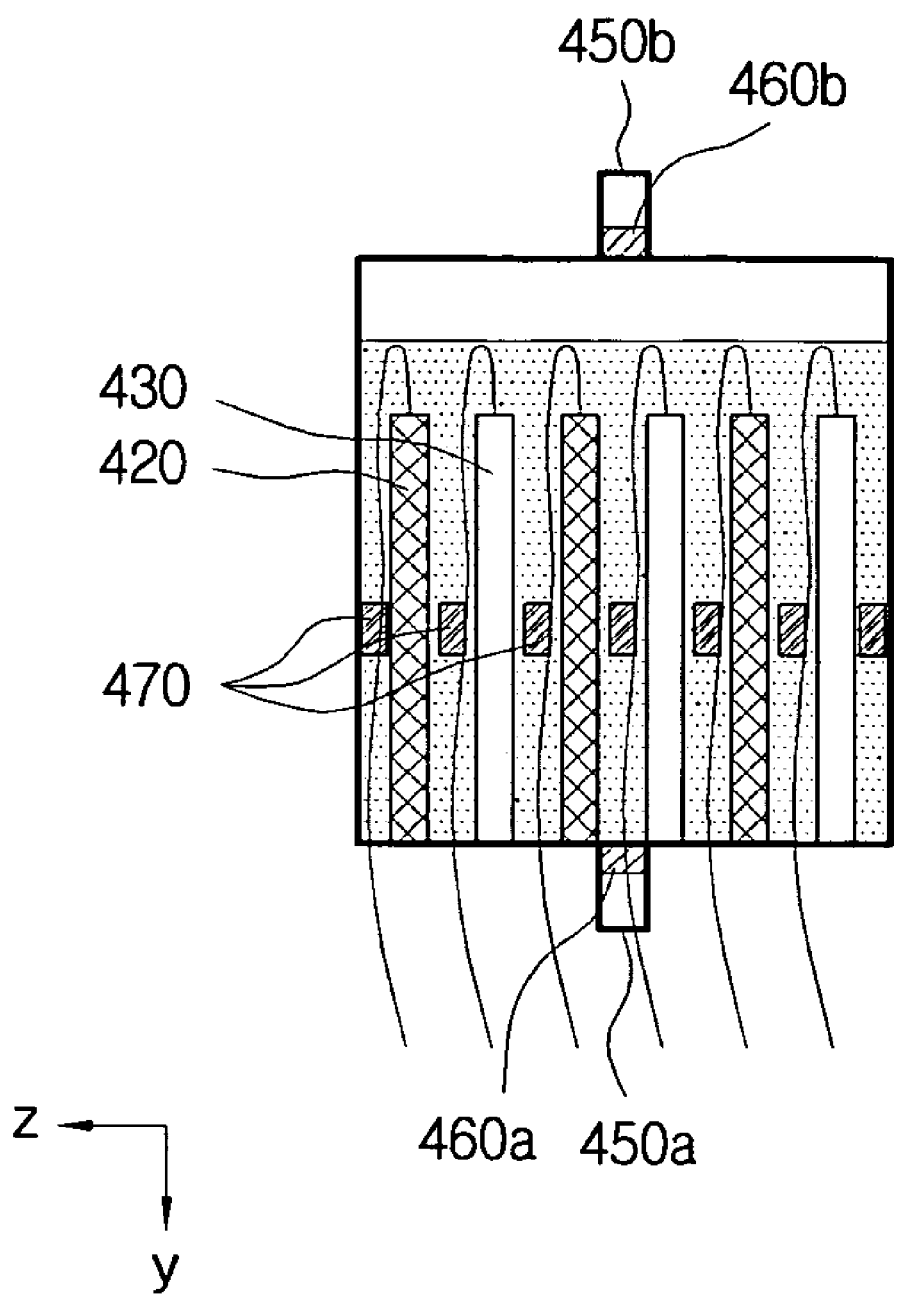

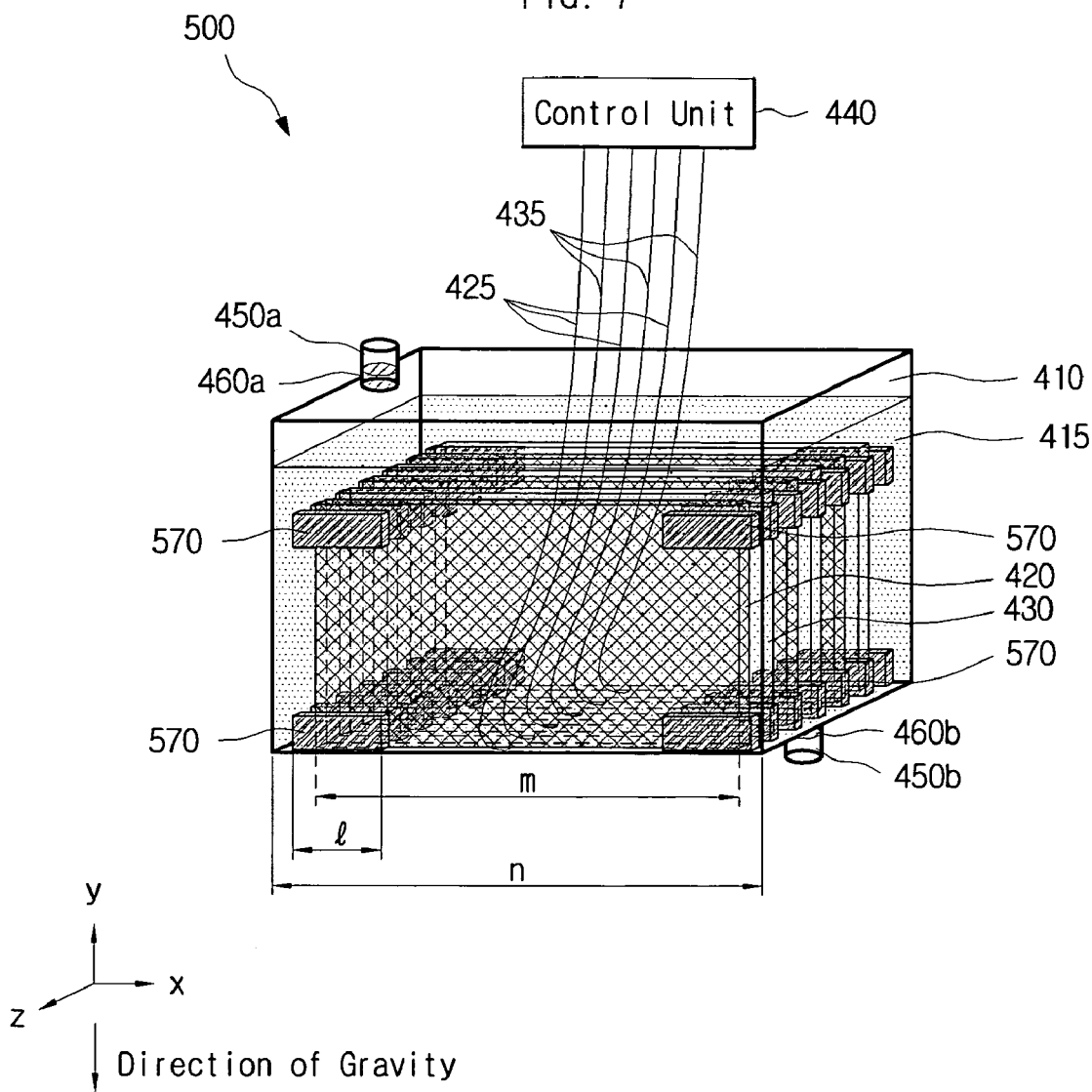

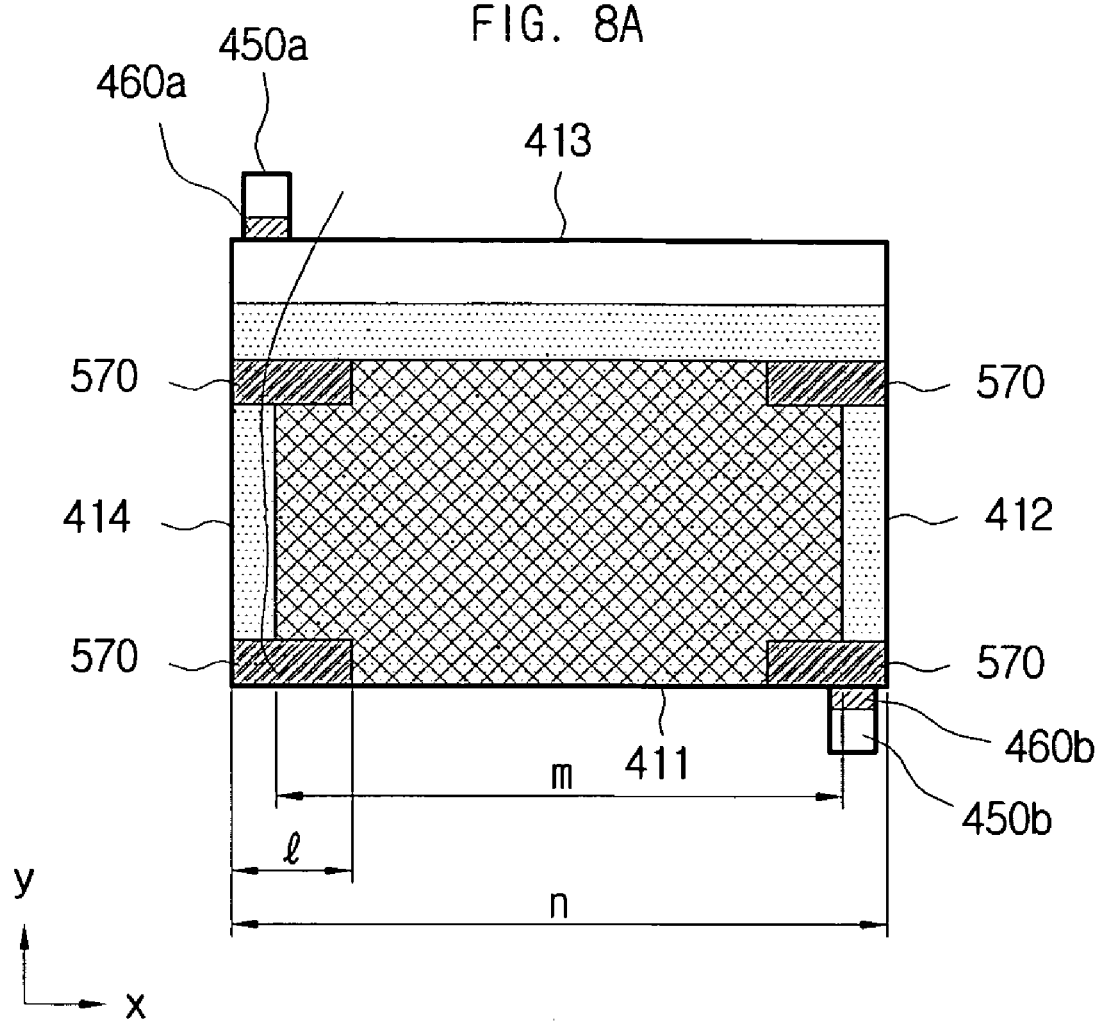

HYDROGEN GENERATING APPARATUS AND FUEL CELL POWER GENERATION SYSTEM

CROSS-REFERENCE TO RELATED APPLICATIONS

This application claims the benefit of Korean Patent Application No. 10-2007-0047737 filed with the Korean Intellectual Property Office on May 16, 2007, the disclosure of which is incorporated herein by reference in its entirety.

BACKGROUND

1. Technical Field

The present invention relates to a hydrogen generating apparatus and to a fuel cell power generation system.

2. Description of the Related Art

A fuel cell is an apparatus that converts the chemical energies of fuel (hydrogen, LNG, LPG, methanol, etc.) and air directly into electricity and heat, by means of electrochemical reactions. In contrast to conventional power generation techniques, which employ the processes of burning fuel, generating vapor, driving turbines, and driving power generators, the utilization of fuel cells does not entail combustion processes or driving apparatus. As such, the fuel cell is the result of new technology for generating power that offers high efficiency and few environmental problems.

FIG. 1 is a diagram illustrating the operating principle of a fuel cell.

Referring to FIG. 1, a fuel cell 100 may include a fuel electrode 110 as an anode and an air electrode 130 as a cathode. The fuel electrode 110 receives molecular hydrogen ($H_2$), which is dissociated into hydrogen ions ($H^+$) and electrons ($e^-$). The hydrogen ions move past a membrane 120 towards the air electrode 130. This membrane 120 corresponds to an electrolyte layer. The electrons move through an external circuit 140 to generate an electric current. The hydrogen ions and the electrons combine with the oxygen in the air at the air electrode 130 to generate water. The following Reaction Scheme 1 represents the chemical reactions described above.

[Reaction Scheme 1]

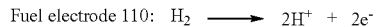
Fuel electrode 110: $H_2 \longrightarrow 2H^+ + 2e^-$

Air electrode 130: $\frac{1}{2}O_2 + 2H^+ + 2e^- \longrightarrow H_2O$

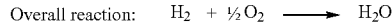
Overall reaction: $H_2 + \frac{1}{2}O_2 \longrightarrow H_2O$

In short, the fuel cell can function as a battery, as the electrons dissociated from the fuel electrode 110 generate a current that passes through the external circuit. Such a fuel cell 100 is a relatively pollution-free power source, because it does not produce any polluting emissions such as SOx, NOx, etc., and produces only little amounts of carbon dioxide. The fuel cell may also offer several other advantages, such as low noise and little vibration, etc.

In order for the fuel cell 100 to generate electrons at the fuel electrode 110, a hydrogen generating apparatus may be needed, which modifies a regular fuel containing hydrogen atoms into a gas having a high hydrogen content, as required by the fuel cell 100.

A hydrogen storage tank can be used, as a commonly known substitute for the hydrogen generating apparatus, but the tank apparatus occupies a large volume and has to be kept with special care. In order for the fuel cell to suitably accommodate the demands in current portable electronic devices (e.g. cell phones, laptops, etc.) for high-capacity power supply apparatus, the fuel cell needs to have a small volume while providing high performance.

FIG. 2 is a perspective view schematically illustrating a hydrogen generating apparatus supplying hydrogen to the fuel cell 100 illustrated in FIG. 1. The hydrogen generating apparatus 200 may include an electrolyte bath 210, first electrodes 220, second electrodes 230, and a control unit 240. For better understanding and more convenient explanation, the following descriptions will assume that the first electrodes 220 are of made magnesium (Mg) and the second electrodes 230 are made of stainless steel.

The electrolyte bath 210 may contain an electrolyte solution 215. The hydrogen generating apparatus 200 may use the electrolyte solution 215 to generate hydrogen gas. The electrolyte bath 210 may further include a hydrogen outlet 250, through which hydrogen may be discharged, and a gas-liquid separation membrane 260 placed at one end of the hydrogen outlet 250 connected with the electrolyte bath 210 that permits the discharge of hydrogen while preventing the discharge of the electrolyte solution 215.

The electrolyte bath 210 can contain the first electrodes 220 and the second electrodes 230. The first and second electrodes 220, 230 may be completely or partially immersed in the electrolyte solution 215.

FIG. 3A is a cross sectional view of the hydrogen generating apparatus illustrated in FIG. 2 when the hydrogen outlet faces a direction opposite the direction of gravity, while FIG. 3B is a cross sectional view of the hydrogen generating apparatus illustrated in FIG. 2 when the hydrogen outlet faces the same direction as the direction of gravity.

Referring to FIGS. 3A and 3B, changing the orientation of the hydrogen generating apparatus 200, in which the positions of the first electrodes and second electrodes 220, 230 are fixed, can lead to a difference in reaction area between the electrolyte solution 215 and the electrodes, and hence to a difference in the amount of hydrogen generated. In FIG. 3B, an area of each electrode corresponding to "A" may not contact the electrolyte solution 215. Thus, the amount of hydrogen generated in a given period of time may differ, making it difficult to supply a constant amount of hydrogen to the fuel cell 100.

A method of resolving this difficulty can be to supply the electrolyte solution in the lower portions to the upper portions using a pump. However, this would require the use of a separate pump and valves, and thus would run counter to efforts for providing compact sizes.

SUMMARY

An aspect of the invention is to provide a hydrogen generating apparatus and a fuel cell system, in which a constant amount of hydrogen can be provided regardless of the orientation.

Another aspect of the invention is to provide a hydrogen generating apparatus and a fuel cell system, in which the electrodes can move together with the movement of the electrolyte solution, so as not to cause discrepancies in reaction area.

Still another aspect of the invention is to provide a hydrogen generating apparatus and a fuel cell system, in which the usage efficiency of the water can be increased.

One aspect of the invention provides a hydrogen generating apparatus that generates a constant amount of hydrogen regardless of the orientation. In one embodiment, the hydrogen generating apparatus can include an electrolyte bath, which contains an electrolyte solution; a free-moving first electrode, which is positioned inside the electrolyte bath, and which generates electrons; a free-moving second electrode, which is positioned inside the electrolyte bath, and which receives the electrons to generate hydrogen; a spacer positioned between the first electrode and the second electrode; and a control unit, which is connected with the first electrode and the second electrode, to control an amount of electrons traveling from the first electrode to the second electrode.

Another aspect of the invention provides a fuel cell power generation system, which includes a hydrogen generating apparatus that generates hydrogen and a fuel cell that receives the hydrogen to produce a direct current by converting the chemical energy of the hydrogen into electrical energy. Here, the hydrogen generating apparatus can include an electrolyte bath, which contains an electrolyte solution; a free-moving first electrode, which is positioned inside the electrolyte bath, and which generates electrons; a free-moving second electrode, which is positioned inside the electrolyte bath, and which receives the electrons to generate hydrogen; a spacer positioned between the first electrode and the second electrode; and a control unit, which is connected with the first electrode and the second electrode, to control an amount of electrons traveling from the first electrode to the second electrode.

The hydrogen generating apparatus and the fuel cell power generation system according to certain embodiments of the invention can include one or more of the following features.

A thickness of the spacer can be equal to or lower than a distance between the first electrode and the second electrode.

Also, the first electrode and the second electrode can be arranged parallel to each other, with the spacer secured to an inner wall of the electrolyte bath on one side that is not parallel to the first electrode and the second electrode. Here, one or more of the spacer can be secured to inner walls of the electrolyte bath on both sides that are not parallel to the first electrode and the second electrode.

A size of the spacer may be determined in correspondence with the sizes of the electrolyte bath and the electrodes.

A wire may additionally be included that connects the first electrode with the control unit, where the wire can be flexible. Also, a wire may be included that connects the second electrode with the control unit, where the wire can be flexible.

Furthermore, the electrolyte bath can include two or more hydrogen outlets that discharge the hydrogen to the exterior, where the hydrogen outlets can be arranged symmetrically with respect to the electrolyte bath. Here, a gas-liquid separation membrane can be included between the electrolyte bath and a hydrogen outlet that permits the discharge of hydrogen but prevents the discharge of the electrolyte solution through the hydrogen outlet.

Additional aspects and advantages of the present invention will be set forth in part in the description which follows, and in part will be obvious from the description, or may be learned by practice of the invention.

BRIEF DESCRIPTION OF THE DRAWINGS

FIG. 1 is a diagram illustrating the operating principle of a fuel cell.

FIG. 2 is a perspective view schematically illustrating a hydrogen generating apparatus supplying hydrogen to the fuel cell illustrated in FIG. 1.

FIG. 4 is a perspective view schematically illustrating a hydrogen generating apparatus based on an embodiment of the invention.

FIG. 5A and FIG. 5B are side elevational views illustrating a hydrogen generating apparatus based on an embodiment of the invention.

FIG. 7 is a perspective view schematically illustrating a hydrogen generating apparatus based on another embodiment of the invention.

FIG. 8A, FIG. 8B, FIG. 8C, and FIG. 8D are front elevational views illustrating a hydrogen generating apparatus based on another embodiment of the invention.

DETAILED DESCRIPTION

Figure 3A:
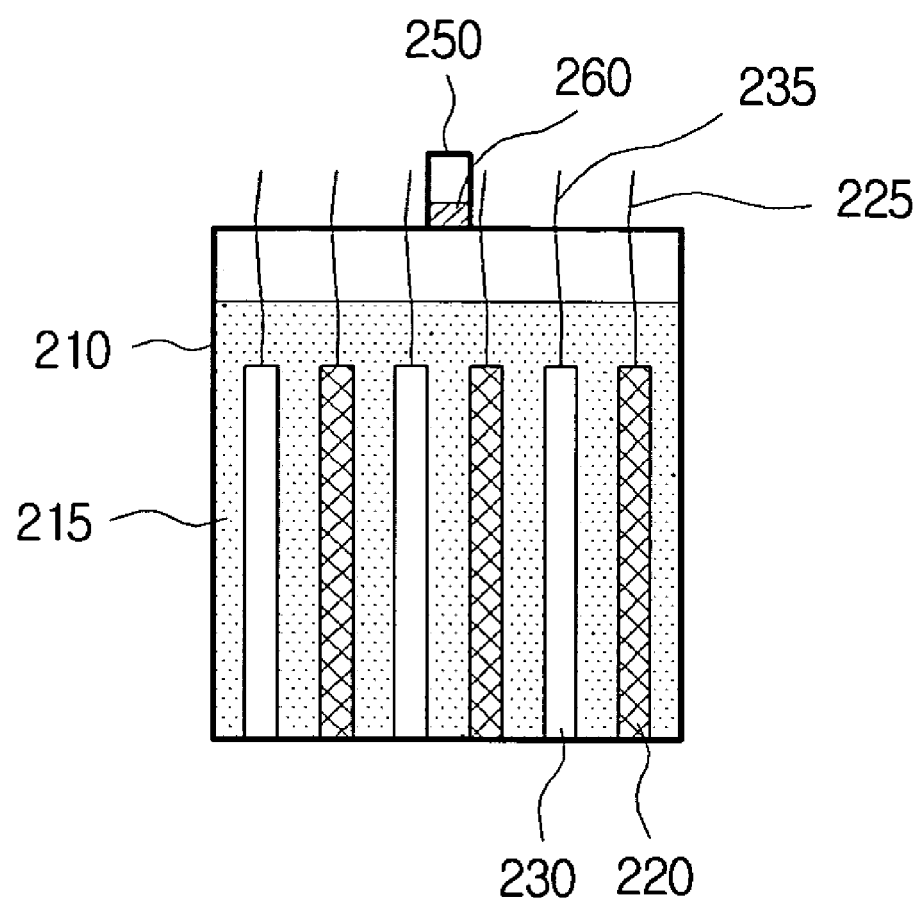
FIG. 3A is a cross sectional view of the hydrogen generating apparatus illustrated in FIG. 2 when the hydrogen outlet faces a direction opposite the direction of gravity.
Figure 3B:
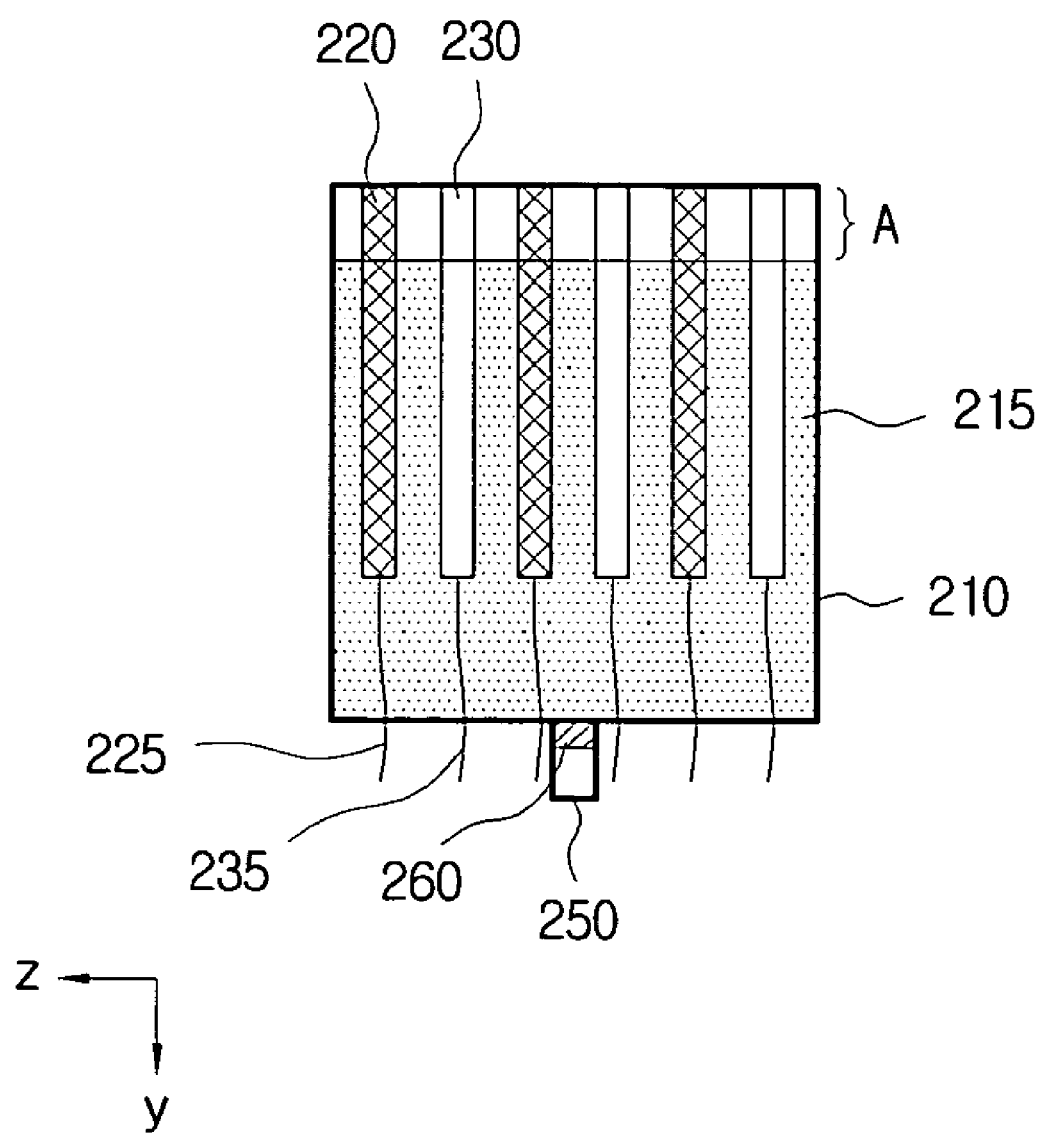
FIG. 3B is a cross sectional view of the hydrogen generating apparatus illustrated in FIG. 2 when the hydrogen outlet faces the same direction as the direction of gravity.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used merely to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Embodiments of the present invention will be described below in detail with reference to the accompanying drawings. For better understanding overall in describing aspects of the present invention, the same reference numerals are used for the same means, regardless of the figure number.

FIG. 4 is a perspective view schematically illustrating a hydrogen generating apparatus based on an embodiment of the invention.

The hydrogen generating apparatus 400 illustrated in FIG. 4 can include an electrolyte bath 410, first electrodes 420, second electrodes 430, and a control unit 440. For better understanding and easier explanation, the following description will be presented using an example configuration, in which the first electrodes 420 are made of magnesium (Mg) and the second electrodes 430 are made of stainless steel.

The electrolyte bath 410 may contain an electrolyte solution 415 inside. The hydrogen generating apparatus 400 is enabled to generate hydrogen gas using the hydrogen ions included in the electrolyte solution 415. A compound such as LiCl, KCl, NaCl, KNO$_3$, NaNO$_3$, CaCl$_2$, MgCl$_2$, K$_2$SO$_4$, Na$_2$SO$_4$, MgSO$_4$, AgCl, etc., can be used as the electrolyte in the electrolyte solution 415.

The first electrodes 420 can be the active electrodes. The chemical reaction that occurs at a first electrode 420 is as follows. Due to the difference in ionization energy between magnesium (Mg) and water (H$_2$O), the magnesium electrode may release two electrons and be oxidized into magnesium ions (Mg$^{2+}$). The electrons thus generated may travel through a first wire 425, a control unit 440, and a second wire 435, to arrive at a second electrode 430.

The second electrodes 430 can be the inactive electrodes. At a second electrode 430, water may be dissociated after receiving the electrons from the first electrode 420, whereby hydrogen may be generated. The reaction above can be represented by the following Reaction Scheme 2.

[Reaction Scheme 2]

First electrode: Mg ⟶ Mg$^{2+}$ + 2e$^-$
Second electrode: 2H$_2$O + 2e$^-$ ⟶ H$_2$ + 2(OH)$^-$
Overall reaction: Mg + 2H$_2$O ⟶ Mg(OH)$_2$ + H$_2$ The rate and efficiency of the chemical reactions described above are determined by a number of factors. Examples of factors that determine the reaction rate include the area of the first electrodes 420 and/or the second electrodes 432, the concentration of the electrolyte solution 415, the type of electrolyte solution 415, the number of first electrodes 420 and/or second electrodes 430, the method of connection between the first electrodes 420 and the second electrodes 430, and the electrical resistance between the first electrodes 420 and the second electrodes 430, etc.

Changes in the factors described above can alter the amount of electric current (i.e. the amount of electrons) flowing between the first electrodes 420 and second electrodes 430, whereby the rate of the electrochemical reaction represented in Reaction Scheme 2 may be changed. A change in the rate of the electrochemical reaction will result in a change in the amount of hydrogen generated at the second electrodes 430.

In certain embodiments, the first electrodes 420 and second electrodes 430 can be positioned alternately inside the electrolyte bath 410. In certain other embodiments, one or more of the first electrodes 420 and one or more of the second electrodes 430 can be positioned in separate groups.

The hydrogen generating apparatus 400 can include a control unit 440 between the first electrodes 420 and the second electrodes 430, to adjust the electrical resistance between the first electrodes 420 and second electrodes 430. By changing the electrical resistance between the first electrodes 420 and the second electrodes 430, the magnitude of the electric current between the first electrodes 420 and the second electrodes 430 can be adjusted, making it possible to generate hydrogen by an amount required by the fuel cell.

The control unit 440 may adjust the rate by which the electrons generated at the first electrodes 420 by the electrochemical reactions are transferred to the second electrodes 430. That is, the control unit 440 may adjust the electric current.

The control unit 440 may receive the amount of power or amount of hydrogen required, and if the required value is higher, may increase the amount of electrons flowing from the first electrodes 420 to the second electrodes 430, or if the required value is lower, may decrease the amount of electrons flowing from the first electrodes 420 to the second electrodes 430.

The hydrogen generating apparatus 400 can be coupled with the fuel cell, so that the amount of electrical power or amount of hydrogen required can be inputted from the fuel cell, or the hydrogen generating apparatus 400 can include a separate inputting apparatus to receive input from the user on the amount of electrical power or amount of hydrogen required. Alternately, the hydrogen generating apparatus 400 may have preset values on the amount of hydrogen or amount of electrical power required.

In various embodiments of the invention, there may be one first electrode 420 and/or one second electrode 430, or there may be two or more first and second electrodes 420, 430. If the numbers of first electrodes 420 and/or second electrodes 430 are increased, the amount of hydrogen generation may be increased for the same duration of time, making it possible to generate a desired amount of hydrogen in a shorter time period.

In certain embodiments of the invention, the first electrode 420 can be made of a metal other than magnesium that has a relatively high ionization tendency, such as iron (Fe) or an alkali metal such as aluminum (Al), zinc (Zn), etc. The second electrode 430 can be made of a metal such as platinum (Pt), copper (Cu), gold (Au), silver (Ag), iron (Fe), etc., that has a relatively lower ionization tendency than that of the metal used for the first electrode 420.

Whereas the first electrodes 220 and second electrodes 230 illustrated in FIG. 2 are fixed to the bottom surface among the inner walls of the hydrogen generating apparatus 200, the first electrodes 420 and second electrodes 430 of a hydrogen generating apparatus 400 based on an embodiment of the invention can be such that are not secured to the bottom surface and are able to move freely. The first wires 425 and second wires 435 may be flexible, so that the connection between the control unit 440 and the electrodes may not be disengaged in spite of the movement of the electrodes. In other words, the first wires 425 and second wires 435 may serve to maintain an electrical connection with the control unit 440, to allow adjustments in the flow rate of hydrogen, while at the same time allowing free movement for the electrodes.

As the first electrodes 420 and second electrodes 430 may freely move without being secured, the area of reaction between each of the electrodes and the electrolyte solution 415 can be kept constant, whereby the amount of hydrogen generation can also be kept constant.

In addition, since the electrodes can be made to move freely, it is possible to remove the Mg(OH)$_2$, which is a by-product of the reactions at the electrodes, by mechanical grinding. Thus, the Mg(OH)$_2$ can be prevented from hydration, and the degree of movement of the ions in the water can be increased, for a higher efficiency in utilizing the water.

The hydrogen generating apparatus 400 can further include spacers 470 positioned between electrodes, where each spacer 470 may have one end secured to an inner wall of the electrolyte bath 410. The spacers 470 can prevent the first electrodes 420 and second electrodes 430 from touching one another when the hydrogen generating apparatus 400 changes position, i.e. when the orientation of the hydrogen generating apparatus 400 is changed. Contact between two electrodes can cause short-circuiting. The spacers 470 can also serve to guide the first and second electrodes 420, 430 such that each electrode moves within a particular confined region.

Along the x-axis, the size (l) of a spacer 470 can be greater than the difference between the size (n) of the electrolyte bath 410 and the size (m) of each electrode (see Equation 1).

[Equation 1]

$$l > n - m$$

If the size of a spacer 470 is smaller than the difference between the size of the electrolyte bath 410 and the size of each electrode, an electrode may elude the guiding provided by the spacers 470 when the hydrogen generating apparatus 400 changes orientation.

The spacers 470 can be secured to inner walls other than the two inner walls parallel to the electrodes, which may be arranged parallel to one another inside the electrolyte bath 410. That is, the spacers 470 can be secured to the side walls. In certain embodiments, at least two spacers 470 can be positioned each between two electrodes, with at least one spacer 470 secured to each of the left and right inner walls. The thickness of a spacer 470 (the size along the z-axis) can be smaller than the gap between the respective electrodes.

As described above, the hydrogen generated by the multiple electrodes arranged with predetermined gaps in-between as provided by the spacers 470 may pass through a gas-liquid separation membrane 460. The gas-liquid separation membrane 460 can be positioned between the electrolyte bath 410 and the hydrogen outlet 450, which is a channel through which the hydrogen may be discharged, where the gas-liquid separation membrane 460 permits the permits the discharge of hydrogen but prevents the discharge of the electrolyte solution 415. The hydrogen that has passed through the gas-liquid separation membrane 460 may then pass through a hydrogen outlet 450 and move to the fuel electrode of the fuel cell. Here, the gas-liquid separation membrane 460 can be made of a porous material.

Certain embodiments can include two or more hydrogen outlets 450 and gas-liquid separation membranes 460. In the example illustrated in FIG. 4, a first hydrogen outlet 450*a* and a first gas-liquid separation membrane 460*a*, as well as a second hydrogen outlet 450*b* and a second gas-liquid separation membrane 460*b* may be located in the upper and lower surfaces of the electrolyte bath 410. The set of the first hydrogen outlet 450*a* and the first gas-liquid separation membrane 460*a* can be positioned symmetrically with the set of the second hydrogen outlet 450*b* and the second gas-liquid separation membrane 460*b*, in such an arrangement that any one pair of hydrogen outlet and gas-liquid separation membrane may discharge hydrogen without being blocked by the electrolyte solution 415 regardless of the orientation of the hydrogen generating apparatus 400.

The two or more pairs of a hydrogen outlet and a gas-liquid separation membrane can be positioned symmetrically within the electrolyte bath 410, and can be positioned in upper and lower portions of the side surfaces, besides the upper and bottom surfaces of the electrolyte bath 410.

Figure 5A:
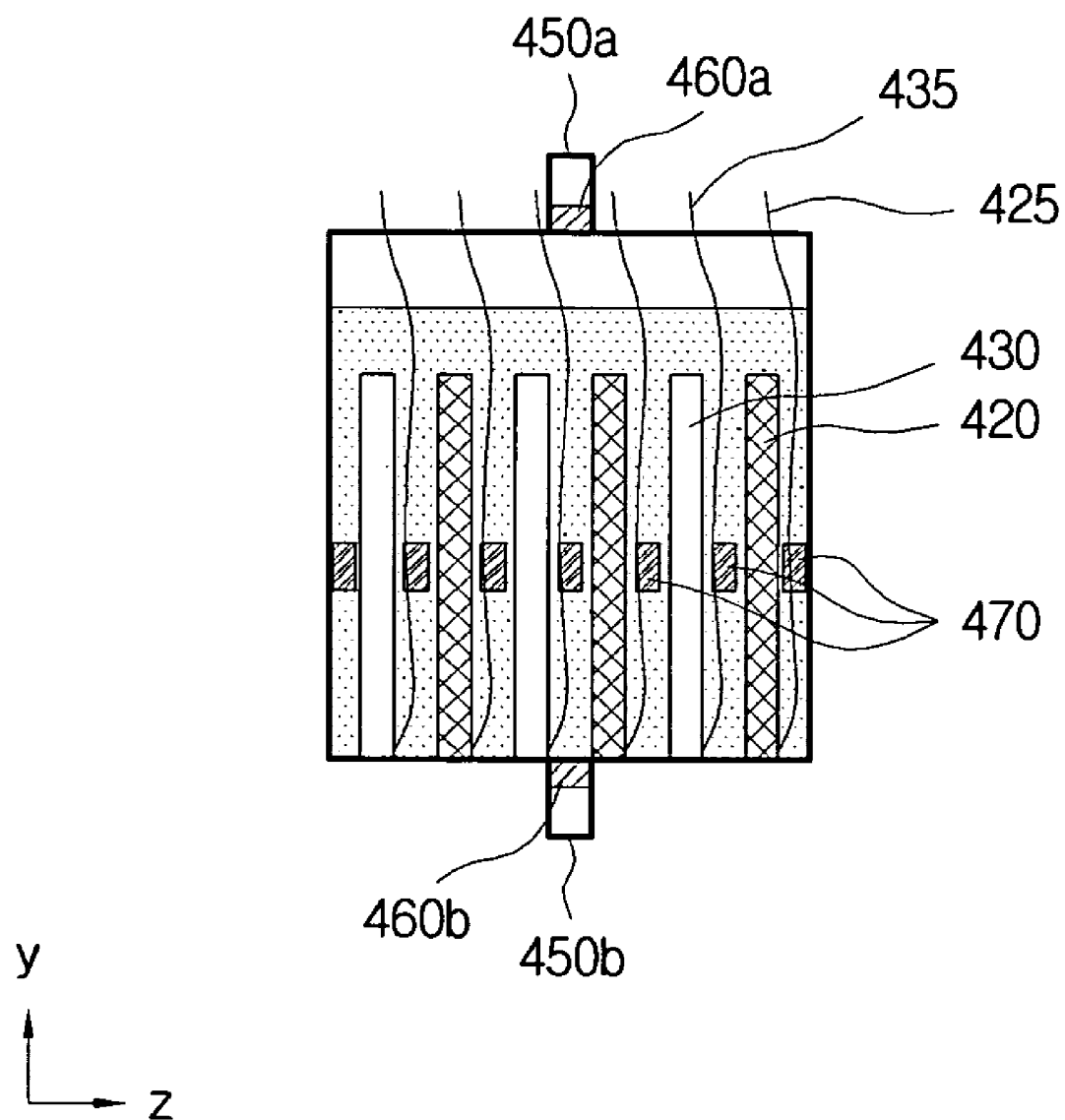

FIG. 5A and FIG. 5B are side elevational views illustrating a hydrogen generating apparatus based on an embodiment of the invention, each representing the hydrogen generating apparatus in its initial position and after rotating 180 degrees.

It will be assumed that the hydrogen generating apparatus 400 positioned as in FIG. 4 (i.e. with the first hydrogen outlet 450*a* and first gas-liquid separation membrane 460*a* facing upwards) is in its initial position (0 degree rotation).

FIG. 5A illustrates the hydrogen generating apparatus 400 after a 0 degree rotation, while FIG. 5B illustrates a 180 degree rotation, as the first hydrogen outlet 450*a* and first gas-liquid separation membrane 460*a* face downwards.

With a 0 degree rotation, all of the first electrodes 420 and second electrodes 430 can be immersed completely in the electrolyte solution 415, so that the reaction areas are substantially equal to the areas of the first and second electrodes 420, 430.

With a 180 degree rotation, the spacers 470 can guide the first electrodes 420 and the second electrodes 430 to move downwards (in the direction of the y-axis illustrated in FIG. 5B) while preventing the electrodes from touching one another. Here, the first wires 425 and second wires 435 connected respectively to the bottoms of the electrodes can have a flexible quality, as described above, so as not to obstruct the movement of the first electrodes 420 and second electrodes 430. In this case, although the first hydrogen outlet 450*a* may be blocked by the electrolyte solution 415, the second hydrogen outlet 450*b* can face upwards, so that the hydrogen generated inside the electrolyte bath 410 may be provided to the outside of the hydrogen generating apparatus 400.

FIG. 6A through FIG. 6D are front elevational views illustrating a hydrogen generating apparatus based on an embodiment of the invention, which respectively illustrate the hydrogen generating apparatus in its initial position, and after rotating 90 degrees, 180 degrees, and 270 degrees.

As the size (l) of each of the spacers 470 is as shown in Equation 1 above, each of the electrodes can be prevented by the spacers 470 from moving beyond a particular region and from coming into contact with another electrode, even when the orientation is changed. Because the electrodes are able to move freely, they can always move in the direction of gravity, regardless of the orientation of the hydrogen generating apparatus 400.

When in the initial position (see FIG. 6A), the electrodes may touch the bottom surface 411 of the electrolyte bath 410, where the first hydrogen outlet 450*a* can be unobstructed by the electrolyte solution 415, so that hydrogen gas may be provided to the exterior.

Figure 6A:
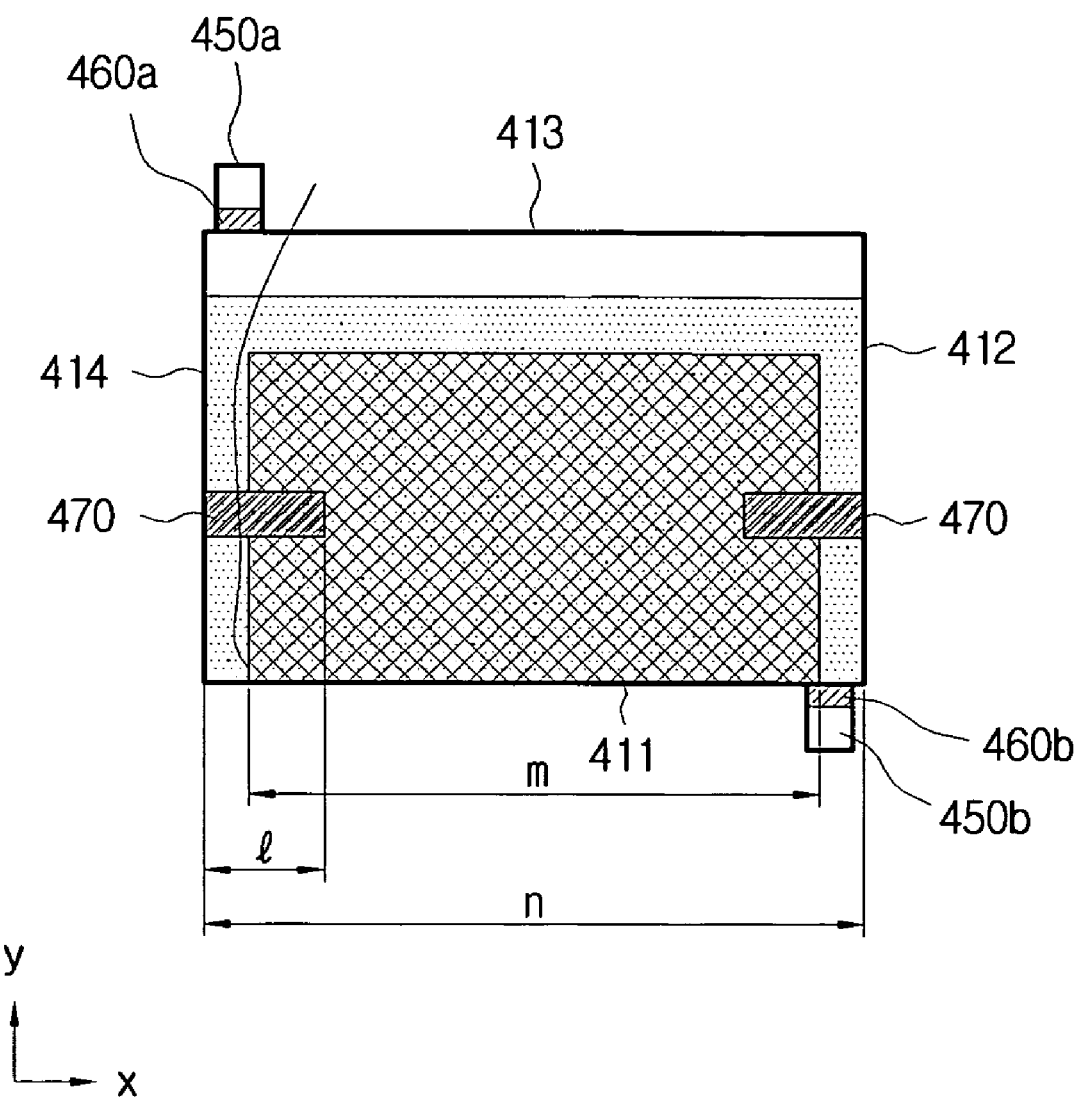
FIG. 6A, FIG. 6B, FIG. 6C, and FIG. 6D are front elevational views illustrating a hydrogen generating apparatus based on an embodiment of the invention.
Figure 6B:
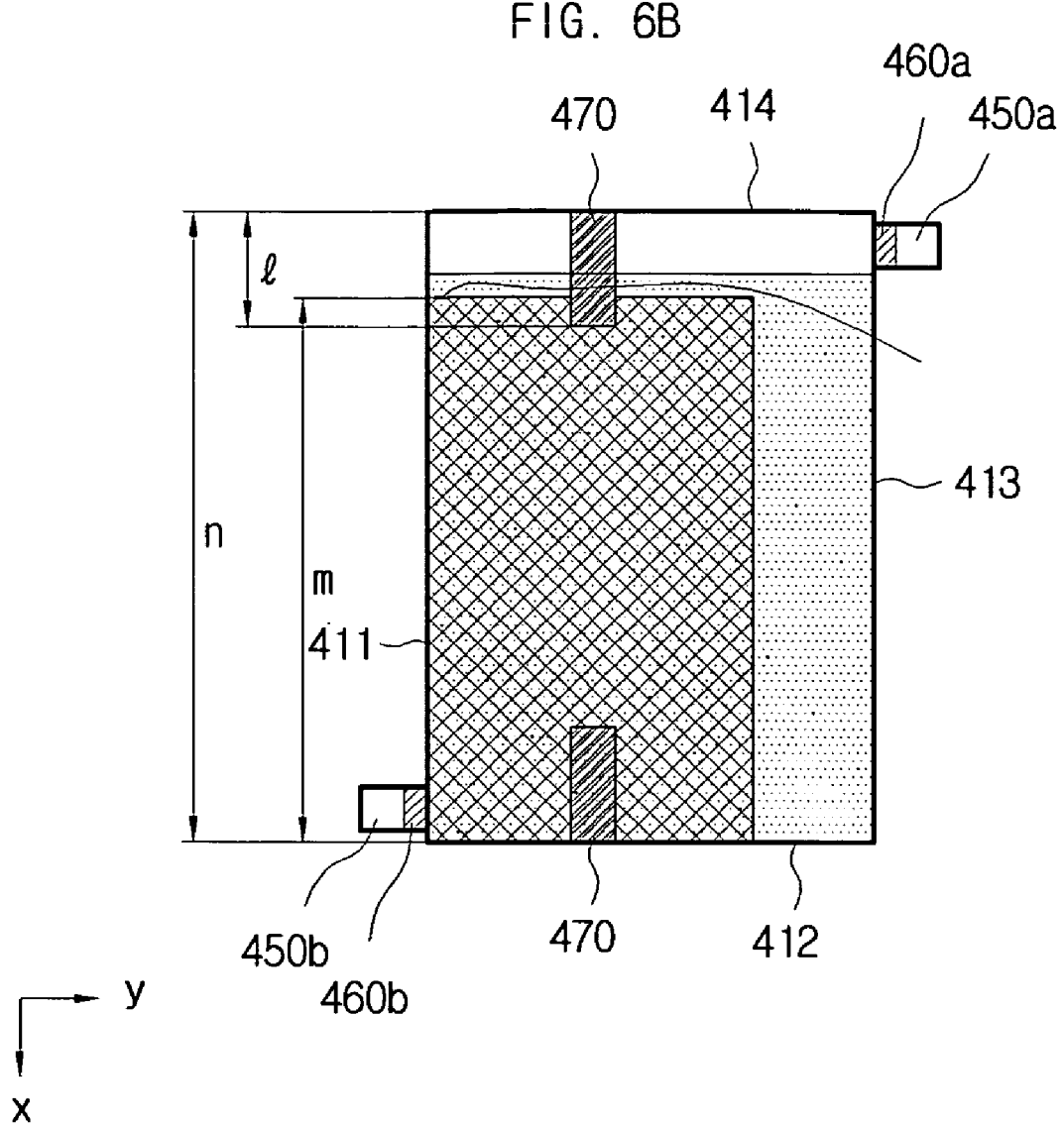

When rotated 90 degrees (see FIG. 6B), the electrodes may move in the direction of gravity (in the (+) direction of the x-axis in FIG. 6B) to touch the right surface 412 of the electrolyte bath 410, where the first hydrogen outlet 450*a* can be unobstructed by the electrolyte solution 415, so that hydrogen gas may be provided to the exterior.

Figure 6C:
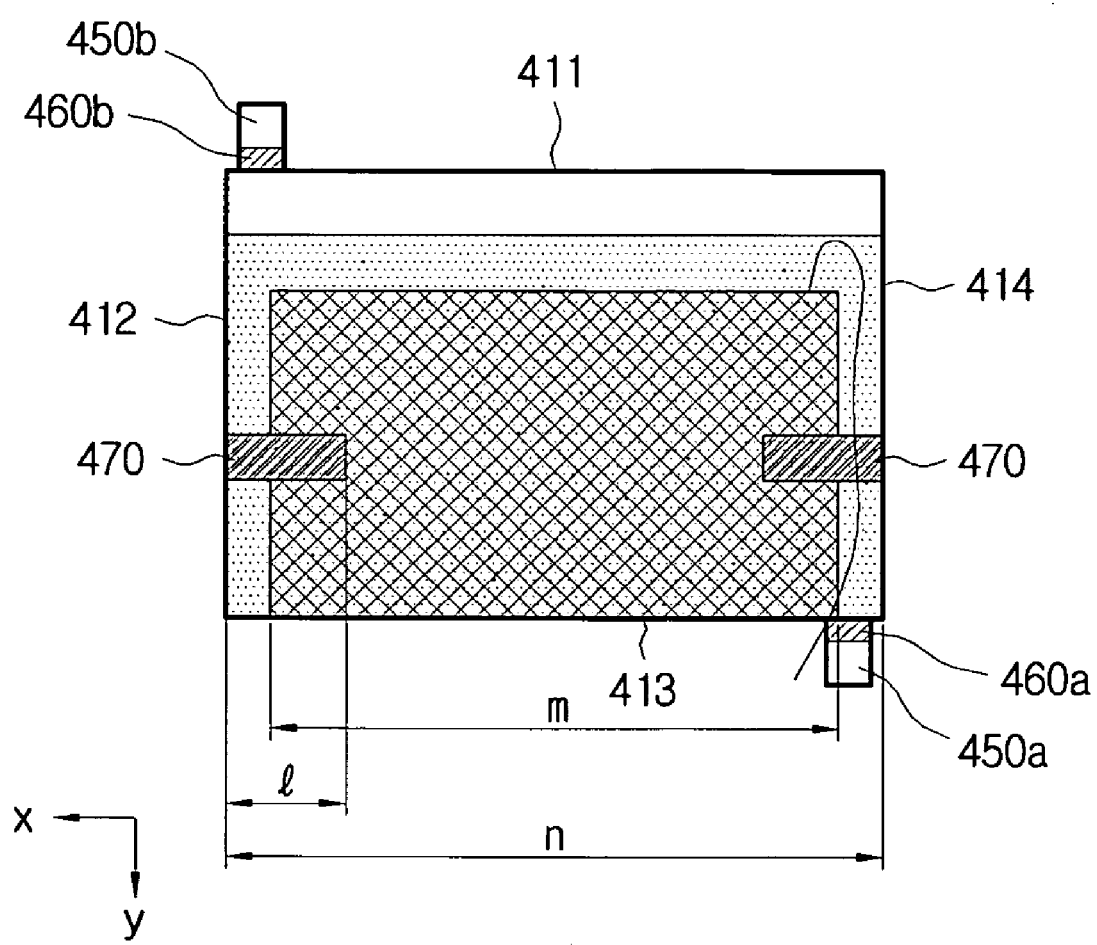

When rotated 180 degrees (see FIG. 6C), the electrodes may move in the direction of gravity (in the (+) direction of the y-axis in FIG. 6C) to touch the upper surface 413 of the electrolyte bath 410, where the second hydrogen outlet 450*b* can be unobstructed by the electrolyte solution 415, so that hydrogen gas may be provided to the exterior.

Figure 6D:
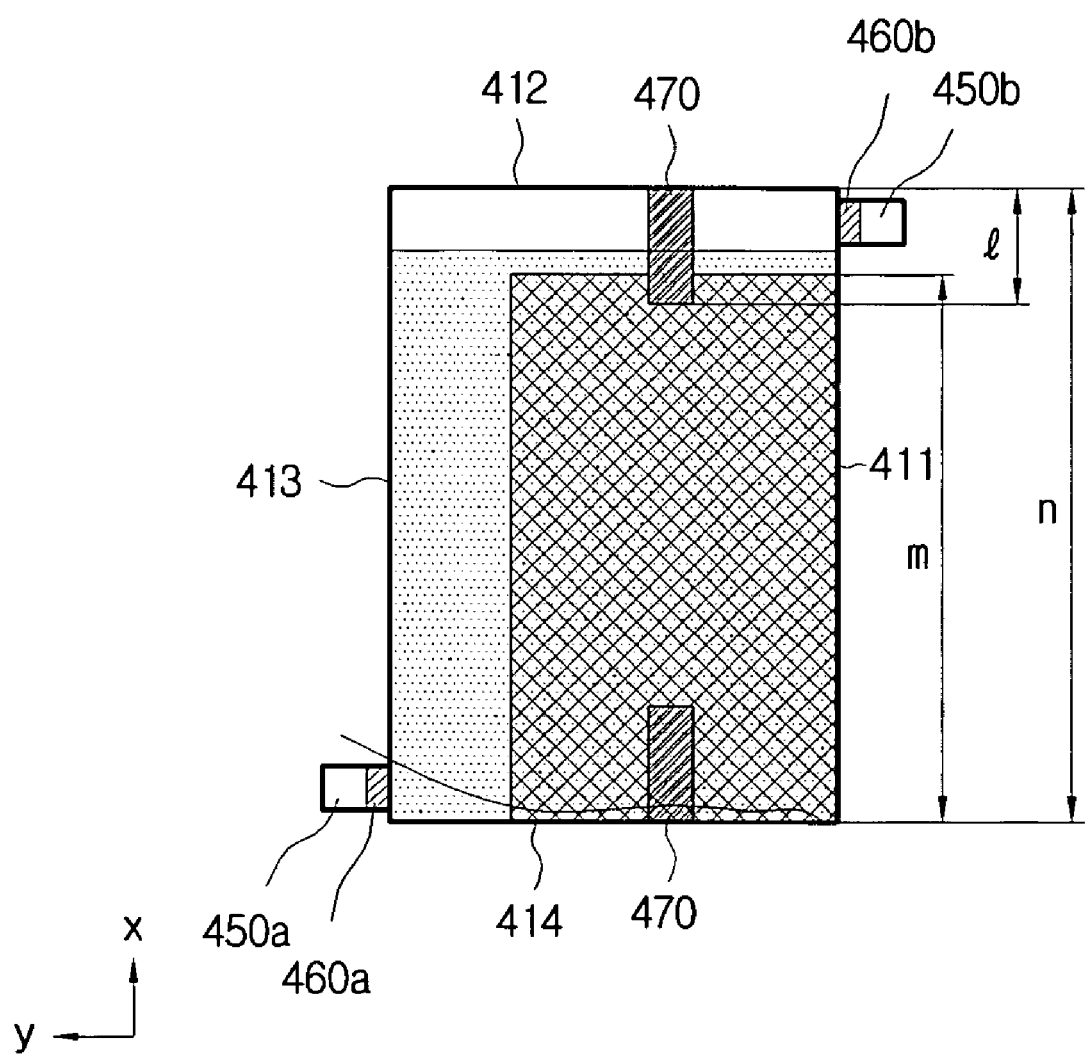

When rotated 270 degrees (see FIG. 6D), the electrodes may move in the direction of gravity (in the (−) direction of the x-axis in FIG. 6D) to touch the left surface 414 of the electrolyte bath 410, where the second hydrogen outlet 450*b* can be unobstructed by the electrolyte solution 415, so that hydrogen gas may be provided to the exterior.

In order that one or more of the first hydrogen outlet 450*a* and the second hydrogen outlet 450*b* may remain unblocked by the electrolyte solution 415 regardless of the orientation of the hydrogen generating apparatus 400, as shown in FIGS. 6A to 6D, so that hydrogen may be provided to the exterior, the hydrogen outlets can be located in symmetrical positions in the electrolyte bath 410.

FIG. 7 is a perspective view schematically illustrating a hydrogen generating apparatus based on another embodiment of the invention. The hydrogen generating apparatus 500 illustrated in FIG. 7 performs substantially the same function as the hydrogen generating apparatus 400 illustrated in FIG. 4, except that the number and positions of the spacers 570 are different from those of the spacers 470 illustrated in FIG. 4.

The spacers 570 illustrated in FIG. 7 can be secured to the side surfaces other than the sides parallel to the electrodes. Each electrode may have four spacers 570 positioned in the front and four spacers 570 positioned in the back which provide a particular amount of space for each electrode and allow free movement in the event of a change in orientation.

The size (l) of a spacer 570 (along the direction of the x-axis) may be such that satisfies the above Equation 1.

It will be understood by those skilled in the art that the size and/or positions of the spacers may vary without departing from the spirit of the invention.

FIGS. 8A through 8D are front elevational views illustrating a hydrogen generating apparatus based on another embodiment of the invention, which respectively illustrate the hydrogen generating apparatus in its initial position, and after rotating 90 degrees, 180 degrees, and 270 degrees.

As the size (l) of each of the spacers 570 is as shown in Equation 1 above, each of the electrodes can be prevented by the spacers 570 from moving beyond a particular region and from coming into contact with another electrode, when the orientation is changed. Because the electrodes are able to move freely, they can always move in the direction of gravity, regardless of the orientation of the hydrogen generating apparatus 500.

When in the initial position (see FIG. 8A), the electrodes may touch the bottom surface 411 of the electrolyte bath 410, where the first hydrogen outlet 450a can be unobstructed by the electrolyte solution 415, so that hydrogen gas may be provided to the exterior.

Figure 8B:
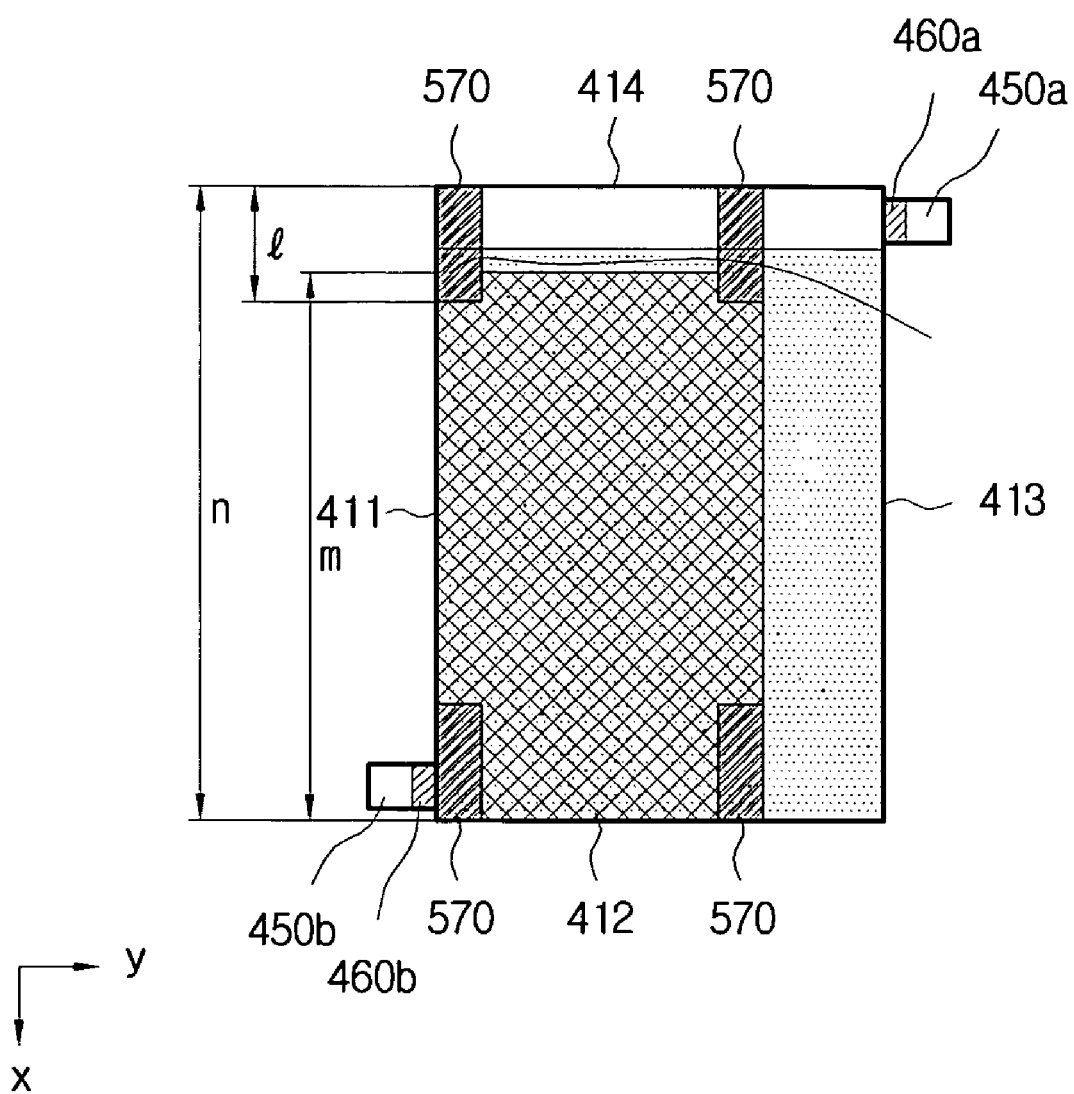

When rotated 90 degrees (see FIG. 8B), the electrodes may move in the direction of gravity (in the (+) direction of the x-axis in FIG. 8B) to touch the right surface 412 of the electrolyte bath 410, where the first hydrogen outlet 450a can be unobstructed by the electrolyte solution 415, so that hydrogen gas may be provided to the exterior.

Figure 8C:
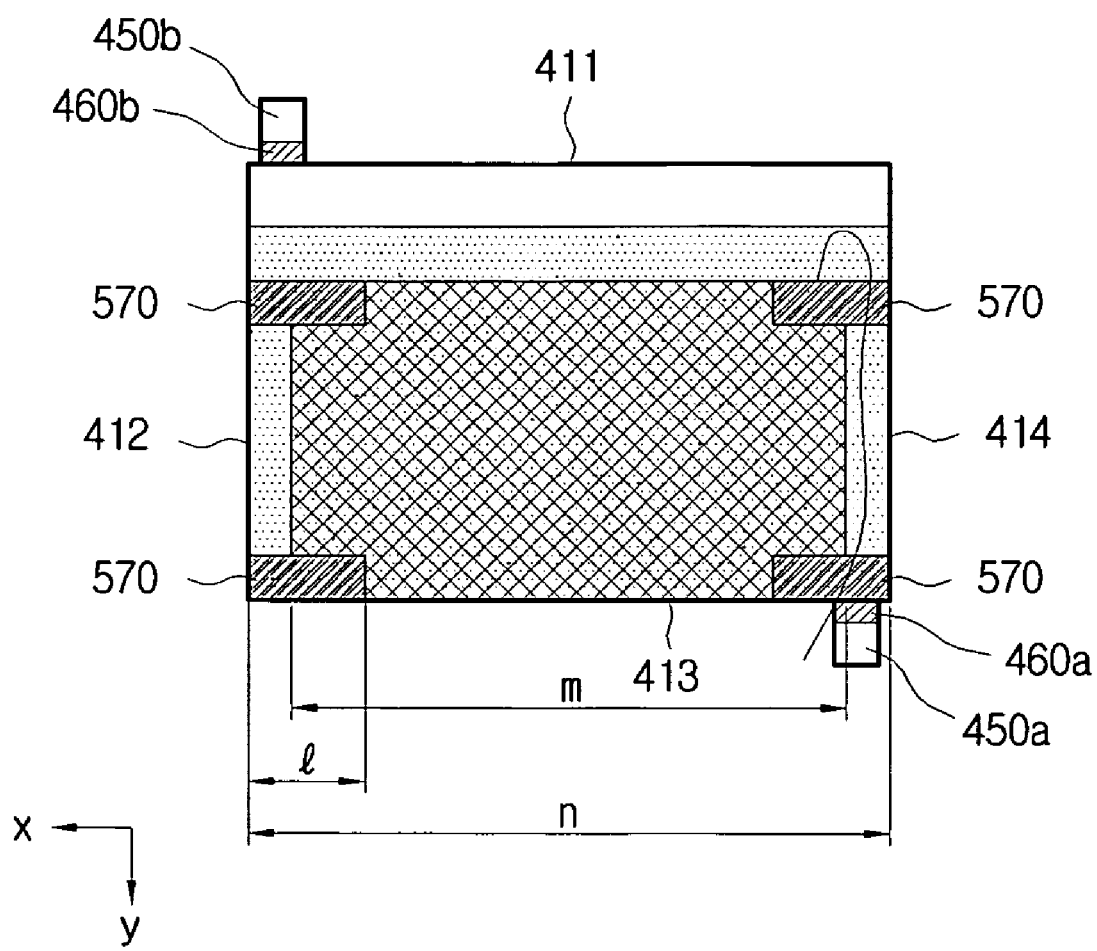

When rotated 180 degrees (see FIG. 8C), the electrodes may move in the direction of gravity (in the (+) direction of the y-axis in FIG. 8C) to touch the upper surface 413 of the electrolyte bath 410, where the second hydrogen outlet 450b can be unobstructed by the electrolyte solution 415, so that hydrogen gas may be provided to the exterior.

Figure 8D:
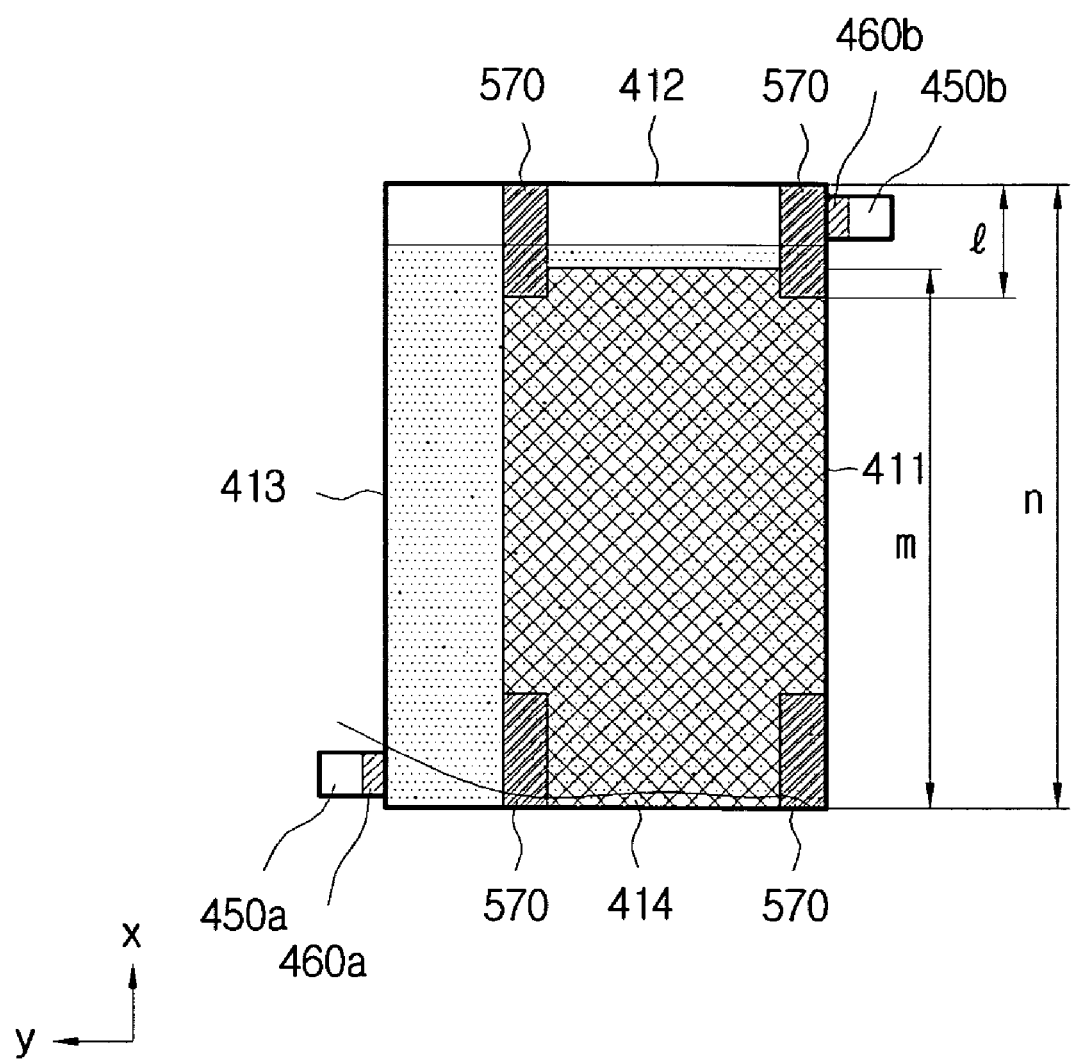

When rotated 270 degrees (see FIG. 8D), the electrodes may move in the direction of gravity (in the (−) direction of the x-axis in FIG. 8D) to touch the left surface 414 of the electrolyte bath 410, where the second hydrogen outlet 450b can be unobstructed by the electrolyte solution 415, so that hydrogen gas may be provided to the exterior.

In order that one or more of the first hydrogen outlet 450a and the second hydrogen outlet 450b may remain unblocked by the electrolyte solution 415 regardless of the orientation of the hydrogen generating apparatus 400, as shown in FIGS. 8A to 8D, so that hydrogen may be provided to the exterior, the hydrogen outlets can be located in symmetrical positions in the electrolyte bath 410.

A fuel cell 100, such as that illustrated in FIG. 1, can be connected to one end of a hydrogen generating apparatus based on an embodiment of the invention. The hydrogen generating apparatus and the fuel cell 100 can form a fuel cell power generation system, in which the fuel cell 100 may be supplied with the hydrogen provided by the hydrogen generating apparatus, to convert the chemical energy of the hydrogen into electrical energy and thus produce a direct current.

As set forth above, a hydrogen generating apparatus according to an aspect of the invention can supply a constant amount of hydrogen regardless of its orientation.

Also, the electrodes can move together with the movement of the electrolyte solution, so that the reaction area may not be changed.

Furthermore, the by-products formed between electrodes can be removed by grinding, to increase the movement of the ions in the electrolyte solution and thus increase the usage efficiency of the water.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A hydrogen generating apparatus comprising: an electrolyte bath containing an electrolyte solution; a free-moving first electrode, the first electrode positioned inside the electrolyte bath—and configured to generate electrons; a free-moving second electrode, the second electrode positioned inside the electrolyte bath—and configured to receive the electrons and generate hydrogen; a plurality of spacers positioned between the first electrode and the second electrode, wherein the spacers act to confine movement of the first and second electrodes to only a direction normal to the plane of the electrodes when the electrolyte bath is tilted with respect to gravity and the electrolyte bath maintains the electrodes within its confines when the bath is tilted with respect to gravity; and a control unit connected with the first electrode and the second electrode, the control unit configured to control an amount of electrons traveling from the first electrode to the second electrode.

2. The hydrogen generating apparatus of claim 1, wherein a thickness of the spacer is equal to or lower than a distance between the first electrode and the second electrode.

3. The hydrogen generating apparatus of claim 1, wherein the first electrode and the second electrode are arranged parallel to each other, and the spacer is secured to an inner wall of the electrolyte bath on one side not parallel to the first electrode and the second electrode.

4. The hydrogen generating apparatus of claim 3, wherein one or more of the spacer is secured to inner walls of the electrolyte bath on both sides not parallel to the first electrode and the second electrode.

5. The hydrogen generating apparatus of claim 1, wherein a size of the spacer is determined in correspondence with sizes of the electrolyte bath and the electrodes.

6. The hydrogen generating apparatus of claim 1, further comprising:
a flexible wire connecting the first electrode and the control unit.

7. The hydrogen generating apparatus of claim 1, further comprising:
a flexible wire connecting the second electrode and the control unit.

8. The hydrogen generating apparatus of claim 1, wherein the electrolyte bath further comprises two or more hydrogen outlets configured to discharge the hydrogen to the exterior,
the hydrogen outlets arranged symmetrically with respect to the electrolyte bath.

9. The hydrogen generating apparatus of claim 8, further comprising:
a gas-liquid separation membrane interposed between the electrolyte bath and the hydrogen outlet,
the gas-liquid separation membrane configured to permit a discharge of the hydrogen through the hydrogen outlet and to prevent a discharge of the electrolyte solution through the hydrogen outlet.

10. A fuel cell power generation system comprising: a hydrogen generating apparatus configured to generate hydrogen; and a fuel cell configured to receive the hydrogen and produce a direct current by converting chemical energy of the hydrogen into electrical energy, wherein the hydrogen generating apparatus comprises: an electrolyte bath containing an electrolyte solution; a free-moving first electrode, the first electrode positioned inside the electrolyte bath and configured to generate electrons; a free-moving second electrode, the second electrode positioned inside the electrolyte bath and configured to receive the electrons and generate hydrogen; a plurality of spacers positioned between the first electrode and the second electrode, wherein the spacers act to confine movement of the first and second electrodes to only a direction normal to the plane of the electrodes when the electrolyte bath is tilted with respect to gravity and the electrolyte bath maintains the electrodes within its confines when the bath is tilted with respect to gravity; and a control unit connected with the first electrode and the second electrode, the control unit configured to control an amount of electrons traveling from the first electrode to the second electrode.

11. The fuel cell power generation system of claim 10, wherein a thickness of the spacer is equal to or lower than a distance between the first electrode and the second electrode.

12. The fuel cell power generation system of claim 10, wherein the first electrode and the second electrode are arranged parallel to each other,
and the spacer is secured to an inner wall of the electrolyte bath on one side not parallel to the first electrode and the second electrode.

13. The fuel cell power generation system of claim 12, wherein one or more of the spacer is secured to inner walls of the electrolyte bath on both sides not parallel to the first electrode and the second electrode.

14. The fuel cell power generation system of claim 10, wherein a size of the spacer is determined in correspondence with sizes of the electrolyte bath and the electrodes.

15. The fuel cell power generation system of claim 10, further comprising:
a flexible wire connecting the first electrode and the control unit.

16. The fuel cell power generation system of claim 10, further comprising:
a flexible wire connecting the second electrode and the control unit.

17. The fuel cell power generation system of claim 10, wherein the electrolyte bath further comprises two or more hydrogen outlets configured to discharge the hydrogen to the exterior,
the hydrogen outlets arranged symmetrically with respect to the electrolyte bath.

18. The fuel cell power generation system of claim 17, wherein the electrolyte bath further comprises two or more hydrogen outlets configured to discharge the hydrogen to the exterior,
the hydrogen outlets arranged symmetrically with respect to the electrolyte bath.

\* \* \* \* \*

UNITED STATES PATENT AND TRADEMARK OFFICE
CERTIFICATE OF CORRECTION

| | | |
|---|---|---|
| PATENT NO. | : 8,172,991 B2 | Page 1 of 1 |
| APPLICATION NO. | : 12/153380 | |
| DATED | : May 8, 2012 | |
| INVENTOR(S) | : Jae-Hyoung Gil et al. | |

It is certified that error appears in the above-identified patent and that said Letters Patent is hereby corrected as shown below:

First Page Column 1 (Inventors), Lines 2-3, Delete "Jae-Hyuk Jank" and insert
-- Jae-Hyuk Jang --, therefor.

Column 10, Line 19, In Claim 1, delete "bath—and" and insert -- bath and --, therefor.

Column 10, Line 21, In Claim 1, delete "bath—and" and insert -- bath and --, therefor.

Signed and Sealed this
Twenty-eighth Day of August, 2012

David J. Kappos
*Director of the United States Patent and Trademark Office*